United States Patent [19]

Falvo

[11] 4,062,753
[45] Dec. 13, 1977

[54] ELECTROLYSIS METHOD AND APPARATUS

[75] Inventor: Ralph Falvo, Niagara Falls, N.Y.

[73] Assignee: Hooker Chemicals & Plastics Corporation, Niagara Falls, N.Y.

[21] Appl. No.: 692,818

[22] Filed: June 4, 1976

Related U.S. Application Data

[62] Division of Ser. No. 335,975, Feb. 26, 1973, Pat. No. 3,976,549.

[51] Int. Cl.² .......................... C25B 1/16; C25B 1/26; C25B 13/04; C25B 13/08
[52] U.S. Cl. ...................................... 204/266; 204/98; 204/252; 204/263; 204/296
[58] Field of Search ................. 204/98, 256, 296, 254, 204/252, 128, 266

[56] References Cited

U.S. PATENT DOCUMENTS

| | | | |
|---|---|---|---|
| 3,718,551 | 2/1973 | Martinsons | 204/98 |
| 3,773,634 | 11/1973 | Stacey et al. | 204/98 |
| 3,809,630 | 5/1974 | DeNora et al. | 204/256 X |
| 3,836,448 | 9/1974 | Bouy et al. | 204/256 X |
| 3,853,721 | 12/1974 | Darlington et al. | 204/296 X |

Primary Examiner—Arthur C. Prescott
Attorney, Agent, or Firm—Peter F. Casella; Herbert W. Mylius

[57] ABSTRACT

An improved method and apparatus for the electrolysis of ionizable chemical compounds is disclosed including specifically a process for the production of chlorine and caustic soda containing low concentrations of sodium chloride by the electrolysis of brine which comprises electrolyzing brine solutions in a two compartment cell equipped with a cathode and an anode separated by permselective barrier formed by sandwiching together two or more membranes consisting essentially of a hydrolyzed copolymer of tetrafluoroethylene and a sulfonated perfluorovinyl ether having the formula $$FSO_2CF_2CF_2OCF(CF_3)CF_2OCF=CF_2$$

said copolymer having an equivalent weight of from about 900 to about 1600. By the use of a multilayer membrane sandwich as the barrier the caustic current efficiency of the process is increased over that obtained when a single layer membrane is used as the barrier separating the cathode and anode.

15 Claims, 1 Drawing Figure

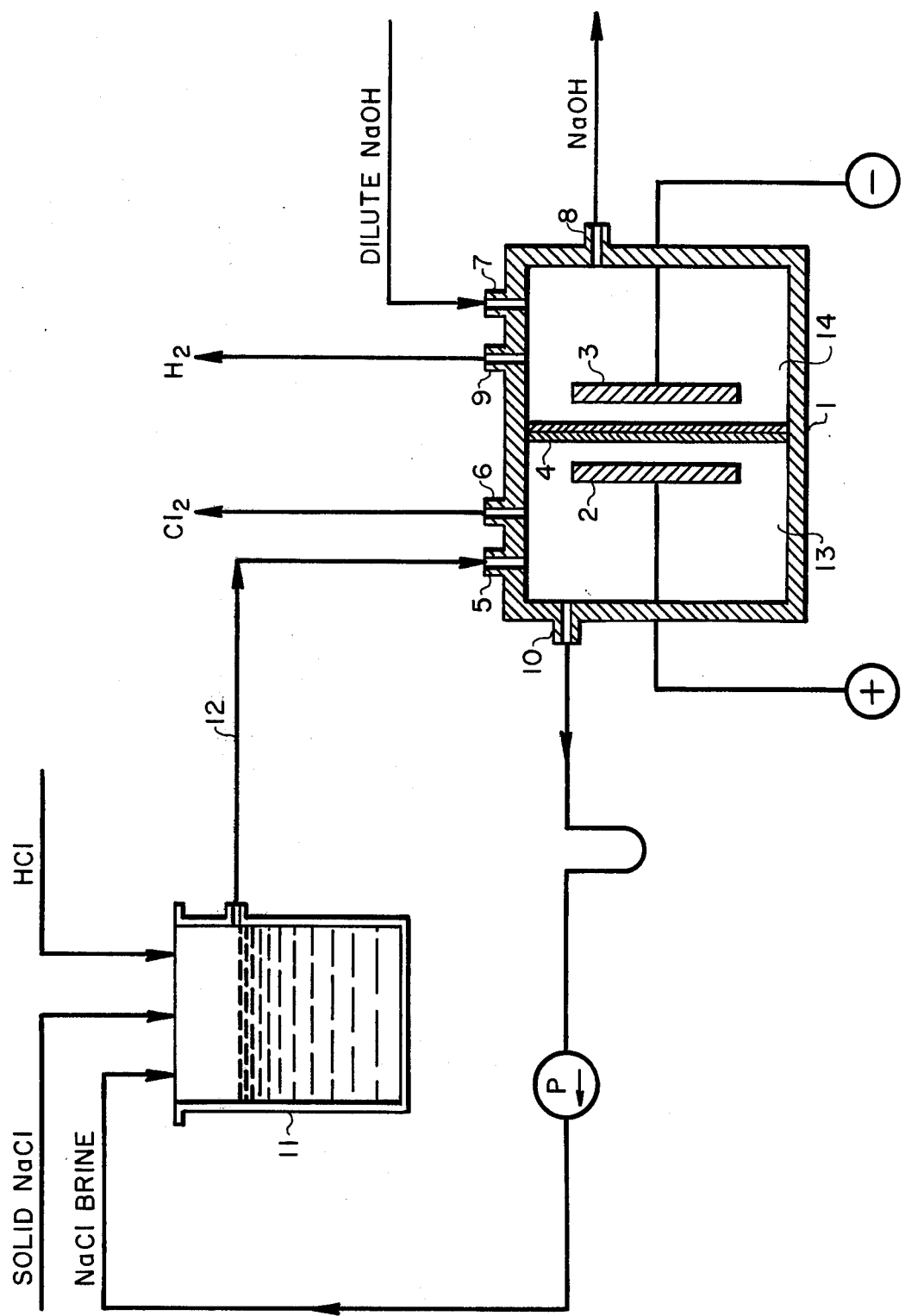

ELECTROLYSIS METHOD AND APPARATUS

This is a division of application Ser. No. 335,975 filed Feb. 26, 1973 now U.S. Pat. No. 3,979,549.

This invention relates to a method and apparatus for the electrolysis of aqueous solutions of ionizable chemical compounds. More particularly it relates to the production of halogens, e.g., chlorine, and alkali metal hydroxides, e.g., sodium hydroxide, by a method which possesses advantages over previously known methods.

BACKGROUND OF THE INVENTION

The electrolysis of aqueous solutions of ionizable chemical compounds, particularly brine solutions, in a cell equipped with an anode and a cathode separated by a porous diaphragm is well known in this art. In most instances such cells are operated under conditions such that ionic migration and molecular migration through the porous diaphragm occurs to a substantial degree resulting in the contamination of the cathode liquor with undecomposed electrolyte and of the anode liquor with reaction products of the cathodic material and anodic materials.

It has been proposed to replace the porous diaphragm in such cells with a diaphragm impervious to both liquids and gasses thereby to control both ionic and molecular migration during electrolysis. Many patents, such as U.S. Pat. No. 2,967,807, U.S. Pat. No. 3,390,055, and French Pat. No. 1,510,265, disclose electrolytic cells incorporating as the diaphragm or barrier, membranes fabricated from synthetic organic ion-exchange resins. Among such resins, cation exchange resins of the "Amberlite" type, sulfonated co-polymers of styrene and divinyl benzene and others have been disclosed.

However, such resins have not been entirely satisfactory for one or more of the following reasons:

a. The resins are not stable to strong caustic and/or concentrated acidic solutions at temperatures above about 75° centigrade.

b. The resins are effective only for relatively short periods.

c. The resins are expensive and fabrication costs are relatively high.

d. The voltage drop through the membrane becomes inordinately high as the caustic concentration in the cathode compartment increases to above about 200 gpl caustic.

e. Ion selectivity and chemical compatibility of the membrane decreases as the caustic concentration of the catholyte liquor increases.

f. Caustic efficiency of the electrolysis decreases as the caustic concentration in the cathode compartment increases.

In application Ser. No. 212,171 of Edward H. Cook, Jr. et al, filed Dec. 12, 1971, a process and apparatus is disclosed for carrying out the electrolysis of an ionizable chemical compound, specifically sodium chloride in a cell containing interposed between the anode and cathode thereof, a barrier composed of a single layer of a permselective membrane which is substantially impervious to liquids and gases, inert with respect to the electrolyte and products of the electrolysis and which is composed essentially of a hydrolyzed copolymer of tetrafluoroethylene and a sulfonated perfluorovinyl ether. This cell can be operated for extended periods without destruction of the diaphragm material and produces a caustic soda product which contains a low content of sodium chloride. However, it has been found that the caustic current efficiency has a tendency to decrease as the caustic concentration of the catholyte liquor increases above about 100 grams per liter ("gpl").

It can be seen that prior art procedures for electrolyzing aqueous solutions containing electrolysis wherein barriers or diaphragms comprising an ion-exchange substance are used to separate the cathode and anode compartments leave something to be desired.

OBJECTS OF THE INVENTION

It is thus a primary object of this invention to provide a novel electrolysis apparatus and method which overcomes the difficulties inherent in the prior art methods encountered in segregating the desirable products during the electrolytic decomposition of chemical compounds in electrolytic cells of the barrier or diaghragm type without loss of the many advantages inherently connected therewith.

It is another object to devise a process utilizing as the barrier a material which precludes or substantially reduces both molecular migration and undesirable ionic migration but which still permits the efficient conduction of electric current by movement of desirable ions.

It is a particular object to devise a process employing a barrier material for the cell which will give high purity products in high yield without undue loss of electrical current and loss of product yield due to ionic and/or molecular migration.

A further object is to devise a process employing multilayers of a permselective material as the barrier which can be operated with high current efficiency for long periods without destruction of the diaphragm.

Other objects and advantages will be apparant to those skilled in this art on consideration of this specification and the appended claims.

SUMMARY OF THE INVENTION

The objects and advantages of this invention are accomplished by carrying out the electrolysis of an aqueous solution of an ionizable chemical compound in a cell containing, interposed between the electrodes thereof, a barrier or diaphragm composed of at least two layers of permselective membrane material which is substantially impervious to liquids and gases, which is inert with respect to the electrolyte and products of the electrolysis, and which is composed essentially of a hydrolyzed copolymer of tetrafluoroethylene and a sulfonated perfluorovinyl ether. The diaphragm, barrier, or septum employed in the process of this invention is comprised of at least two layers of the permselective membrane which may be superimposed, one upon the other, or separated by a porous material such as asbestos.

DETAILED DESCRIPTION OF THE INVENTION

In order that the invention may be more readily understood, it will be described with specific reference to certain preferred embodiments, and specifically with reference to the electrolysis of an aqueous solution of sodium chloride whereby chlorine, caustic soda, and hydrogen are produced. It, however, is not to be construed as limited thereto except as defined in the appended claims.

In accordance with a preferred mode of carrying out the invention, an aqueous solution of sodium chloride is electrolyzed in a chlor-alkali cell comprised of a vessel divided into an anode compartment containing an anode and a cathode compartment containing a cathode, the compartments being separated by a barrier substantially impervious to fluids and gases and being composed essentially of at least two layers of a hydrolyzed co-polymer of tetrafluoroethylene and a sulfonated perfluorovinyl ether having the formula $$FSC_2CF_2CF_2OCF(CF_3)CF_2OCF=CF_2$$

said co-polymer having an equivalent weight of from about 900 to 1600. Preferably the equivalent weight of the co-polymer is from about 1100 to 1400.

Co-polymers of the character referred to above are prepared as disclosed in U.S. Pat. No. 3,282,875, by reacting, at a temperature below about 110° centigrade a perfluorovinyl ether of the formula $$FSO_2CF_2CF_2OCF(CF_3)CF_2OCF=CF_2$$

with tetrafluoroethylene in an aqueous liquid phase, preferably at a pH below 8, and in the presence of a free radical initiator such as ammonium persulfate, and subsequently hydrolyzing the acyl fluoride groups to the free acid or salt form by conventional means.

The method and apparatus of this invention will be further described with reference to the attached drawing which shows a schematic view of the electrolytic cell, 1, comprising an anode, 2, and a cathode, 3, separated by a two layer "sandwich" of a permselective membrane barrier, 4, to form an anolyte compartment, 13, and a catholyte compartment, 14. The cell, 1, has an inlet, 5, in the anode compartment, 13, for the electrolyte, and an outlet, 6, for chlorine gas. There is also provided an inlet, 7, for charging liquid, such as a dilute aqueous caustic soda, to the cathode compartment, 14, an outlet, 8, for discharging NaOH liquor from the cathode compartment, and an outlet, 9, for hydrogen gas.

Brine is continuously circulated in the anolyte compartment 13, by introducing brine through inlet 5 and withdrawing it through overflow, 10, to the replenishing zone, 11, where the brine is replenished with sodium chloride and acidified with acid, if desired. The replenished electrolyte flows, via line 12, to reenter cell, 1, at inlet 5.

In the preferred embodiment, sodium chloride brine solutions containing from about 200 gpl to 320 gpl sodium chloride are electrolyzed in cells having an anode compartment and a cathode compartment separated by a two layer sandwich of a homogeneous cation active membrane formed from a copolymer of the type described above which copolymer is substantially impervious to gases and liquids, by impressing a decomposition voltage across the electrodes disposed in each of said compartments, while maintaining the alkali metal hydroxide content in said cathode compartment above about 10% by weight, and preferably from about 24 to about 38 percent by weight, and recovering an alkali metal hydroxide product from said cathode compartment containing less than about one percent by weight of sodium chloride, and chlorine from said anolyte compartment.

The present invention has the desirable advantage over many prior art electrolysis cells and processes, in that the cell, is readily converted for use for the electrolysis of hydrochloric acid to produce chlorine and hydrogen, the latter being obtained substantially free from chlorine. Thus the cells of this invention can be readily and economically modified for use to electrolyze either brine or hydrochloric acid, as the demand warrants. Accordingly, it is a feature of this invention that it can be efficiently operated to produce chlorine at high, e.g. about 99 percent anode efficiency, and high purity caustic soda or high purity hydrogen gas as principal products.

It is preferred when operating the cell for the electrolysis of brine, to use acidified brine as the feed to the anolyte compartment. The addition of hydrochloric acid to the brine feed has been found to neutralize such hydroxyl ions which migrate from the catholyte to the anolyte. The amount of acid used to acidify the brine feed can be varied over a broad range. By the addition of acid to the brine feed, the pH of the anolyte may be varied over a broad range also. Preferably acid additions are made to control the pH of the anolyte and the anolyte liquor should have a pH in the range of about 1 to 5, and especially within the range of about 3.0 to 4.5. The maintenance of a pH within the ranges set out above in the anolyte compartment, by reducing the hydroxyl ions concentration in the anolyte, reduces the formation of sodium chlorate in the anolyte. Thus the lower the pH in the anolyte, the less sodium chlorate is formed in the anolyte and consequently the higher the efficiency of the cell.

In the preferred operation of the cell for the electrolysis of hydrochloric acid, the feed to the anode compartment is an aqueous hydrochloric acid solution, desirably having an HCl content of from about 10% to 36% by weight and preferably of from about 15% to 25%. The feed to the cathode compartment may be water, although desirably it is also an aqueous hydrochloric acid solution having an HCl content of from about 1% to 10% by weight with from about 1% to 5%, being preferred. The feed to both the anode and cathode compartments should be free of alkali metal, or other contaminating ions, although, when a steel or other corrodible cathode is used, alkali metal chlorides may be added to the anode compartment feed to minimize corrosion. Where such additions are used, amounts of the alkali metal chloride, e.g. NaCl, within the range of about 1 to 26% by weight of the anolyte are typical.

In general, the process of the present invention, whether using a brine or hydrochloric acid feed, may be operated over a wide temperature range, e.g. from room temperature up to the boiling point of the electrolyte, although temperatures of from about 65° to 90° C are preferred. Similarly, a wide variation in the electrical operating conditions is also possible. Thus, for example, cell voltages of from about 2.3 to 5 volts and anode current densities of from about 0.5 to 4 amps/in² are suitable.

The housing or outer casing member and cover of the electrolytic cell is formed of any electrolytically non-conductive material which is resistant to chlorine, hydrochloric acid and caustic alkali and which will withstand the temperatures at which the cell may be operated. Generally, as has been indicated these temperatures are preferably from about 65 to 90° centigrade. Exemplary of the materials which may be used are high temperature polyvinyl chloride. hard rubber, chlorendic acid based polyester resins, and the like. It will be appreciated that the materials of construction for this housing member preferably have sufficient rigidity as to be self-supporting. Alternatively, however, the housing may be formed of a material which does not fulfill all the above mentioned criteria, such as concrete or cement, which materials are not resistant to hydrochloric acid and chlorine, and have the interior exposed areas of such members coated with a material which does fulfill these requirements. Additionally, even in the case of materials which are substantially self-supporting, such as rigid polyvinyl chloride, it is desirable on occasion such as in the instance of relatively large installations to provide reinforcing members around the exterior of the member, such as metal bands, to provide additional rigidity.

The electrodes for the present electrolytic cell may be formed of any electrically conductive material which will resist the corrosive attack of the various cell reactants and products with which they may come in contact, such as alkali metal hydroxides, hydrochloric acid, and chlorine. Typically, the cathodes may be constructed of graphite, iron, steel, or the like, with steel being generally preferred unless strong hydrochloric acid solute is being electrolyzed. Similarly, the anodes may be formed of graphite or may be metallic anodes. Typically, where metallic anodes are used, these may be formed of a so-called "valve" metal, such as titanium, tantalum or niobium as well as alloys of these in which the valve metal constitutes at least about 90% of the alloy. The surface of the valve metal may be made active by means of a coating of one or more noble metals, noble metal oxides, or mixtures of such oxides, either alone or with oxides of the valve metal. The noble metals which may be used include ruthenium, rhodium, palladium, iridium, and platinum. Particularly preferred metal anodes are those formed of titanium and having a mixed titanium oxide and ruthenium oxide coating on the surface, as is described in U.S. Pat. No. 3,632,498. Additionally, the valve metal substrate may be clad on a more electrically conductive metal core, such as aluminum, steel, copper, or the like.

Instead of having a separate anode and cathode, i.e. monopolar electrodes, if desired, the electrodes may be bipolar. In this instance one side of the electrode will be positive and the other side negative. Although such a bipolar electrode may be homogeneous in composition, preferably it will be formed of steel on the cathode side and an activated valve metal, such as titanium on the anode side, the titanium being coated with one or more noble metals, noble metal oxides or the like, as has been described above.

When sodium chloride solutions are electrolyzed in this cell employing the sandwich barrier described, which is substantially impervious to liquids and gases and has a structure such that it operates as a solid ionized salt, said structure being maintained rigid by the charged network of negative ions or aggregates of negative ions electrically balanced by a number of positive ions which are free to move in and through the structure, i.e., a cation active barrier, it is evident that when the cathode compartment is initially charged with water or dilute aqueous sodium hydroxide, the anode compartment being charged with sodium chloride solution, chloride ions will be attracted to the anode and discharged thereat. Sodium ions will pass through the barrier whereas chloride ions and sodium chloride will be substantially prevented by the impervious barrier from entering into the cathode compartment. Since essentially only sodium ions pass through the barrier an are discharged at the cathode, essentially salt free sodium hydroxide is produced in the cathode compartment. Similarly, when employing the cation active barrier in accordance with this invention, hydroxyl ions are effectively prevented from migrating from the cathode compartment through the barrier into the anode compartment. The current will therefore be carried substantially exclusively by the sodium ions from the anode to the cathode and the difficulties caused by the back migration of the hydroxyl ions are substantially eliminated by the process of this invention.

The new process results in the advantages of low voltage drop in the cell, production of highly pure, i.e., essentially salt free, concentrated solutions caustic soda, operation of the cell at relatively low cell voltage, high current efficiency and, higher caustic efficiency, than in similar cells wherein only a single layer of the permselective membrane is used as the barrier separating the anode and cathode compartments. Moreover, because of the compatibility of the permselective membrane in both chlorine and caustic alkaline environments at elevated temperatures, e.g., about 80° to 110° centigrade, the membranes can be maintained in continuous service for extended periods, surprisingly longer than the permselective membranes of the prior art processes.

The barriers useful in the practice of the present invention can advantageously be prepared and utilized in the form of multiple layers of thin films, either as such or deposited on as inert support, such as a cloth woven of Teflon ® or glass fibers. The thickness of the supported membrane layers can be varied over a considerable range for example, from about 5 to 15 mils in thickness.

The barrier can be fabricated in any desired shape. As generally prepared the co-polymer is obtained in the form of the sulfonyl fluoride. In this non-acid form the polymer is relatively soft and pliable, and can be seam- or butt-welded forming welds which are as strong as the membrane material itself. It is preferred that the polymeric material be shaped and formed in the non-acid state. Following shaping or forming into the desired membrane configuration, the material is conditioned for use by hydrolyzing the sulfonyl fluoride groups to free sulfonic acid or sodium sulfonate groups by boiling in water or caustic alkaline solutions. On boiling in water for about 16 hours, the conditioned membrane material undergoes swelling, about 28 percent, which is isotropic, about 9 percent in each direction. When exposed to brine, the swelling is reduced to about 22 percent which results in a net tightening of the membrane in use. The conditioning process can be carried out either out of the cell or with the barrier in place in the cell. Preferably the barrier is formed by placing two or more layers of the unconditioned membrane one upon the other in a suitable frame and thereafter inserting the unconditioned membrane sandwich barrier in place in the cell and carrying out the conditioning process.

It has been found that the caustic efficiency of processes involving the use of a permselective membrane material is increased by sandwiching together two or more membranes of this copolymeric material and inserting the sandwich as a barrier between the anode and cathode.

The sandwich can be composed of two or more layers of the permselective membrane material or alternate layers of the said membrane and porous membranes, e.g., asbestos woven polypropylene cloth, woven Teflon ® cloth and the like. Thus the barrier can be a sandwich of two layers of the above described homogeneous fluorocarbon copolymer, a sandwich of two layers of said copolymer separated by a porous membrane of asbestos sheet, a four layer sandwich of a first layer of asbestos sheeting, two layers of the copolymer membrane and a final layer of asbestos sheeting. Other combinations of porous materials and permselective membranes will be obvious to those skilled in this art. It will be apparant that as the thickness of the barrier is increased the voltage drop through the barrier will increase and hence the power consumption factor and the resultant increase in cost will militate against the use of barriers of excessive thickness. It will thus be a matter of balancing the increase in caustic efficiency obtained in accordance with the invention against the increase in power costs which will determine the optimum conformation of the sandwich barrier.

It has been found further that whereas the caustic efficiency of a brine electrolysis cell operated with a single layer permselective barrier varies from about 75% with a catholyte caustic concentration of about 150 gpl to about 50% with caustic concentratons of about 260 gpl, when the known single layer barrier is replaced with a two layer sandwich of the permselective membrane, the caustic efficiency varies from about 86% at 150 gpl to about 63% at about 390 gpl.

It has thus been found that by the use of the sandwich barriers of this invention the caustic efficiency of the new processes is not only substantially increased over that of similar processes wherein a single membrane barrier is used but also this caustic efficiency characteristic of the sandwich barrier decreases at a slower rate and remains at a practical value at higher catholyte caustic concentrations.

The following examples illustrate certain preferred embodiments of the present invention. Parts and percentages are by weight and temperatures are given in degrees centigrade unless otherwise indicated.

EXAMPLE 1

A solution of sodium chloride containing about 250 gpl of sodium chloride and sufficient hydrochloric acid to maintain the anolyte pH within the range of about 3.0 to 4.5 was continuously introduced into the anode compartment of a two compartment electrolytic cell as illustrated in the drawing and containing a ruthenium oxide coated titantium mesh anode and a steel mesh cathode. The electrodes, of 60 sq. in. effective area, were separated by two layer sandwich of the cation active permselective membrane as a barrier. The membrane sandwich has an effective area of 60 sq. in. and was composed of two layers of a 10 mil thick film of a hydrolyzed copolymer of tetrafluoroethylene and sulfonated perfluorovinyl ether of equivalent weight of about 1100, prepared according to U.S. Pat. No. 3,282,875, and conditioned to the free acid form by soaking in boiling water for about 16 hours.

The catholyte compartment was fed continuously with water, which together with the water which passed through the barrier by osmosis, maintained the catholyte liquid level constant. Caustic liquor produced in the catholyte compartment flowed from the cell through the overflow pipe continuously and was collected for a period of about 16 hours, and sewered for about 8 hours. The temperature was varied between about 60° and 85°, each variation being maintained for about 24 hours. The cell was operated continuously over a period of 24 days using a current density of one ampere per square inch of diaphragm. The data collected in this experiment is set out in the following table.

TABLE

| Day | Temp. ° C | Anolyte pH | Voltage | NaCl in Catholyte gpl | Avg. NaOH gpl | NaOH Efficiency % |
|---|---|---|---|---|---|---|
| 4 | 60 | 3.9 | 3.63 | 1.16 | 290 | 72.2 |
| 5 | 65 | 3.9 | 3.63 | 0.82 | 256 | 82.0 |
| 6 | 67 | 4.0 | 3.54 | 0.44 | 137 | 86.3 |
| 8 | 59 | 3.1 | 4.11 | 0.47 | 318 | 70.3 |
| 9 | 61 | 3.4 | 4.12 | 0.19 | 230 | 86.4 |
| 10 | 81 | 3.9 | 3.22 | 0.37 | 186 | 83.4 |
| 12 | 82 | 3.7 | 3.45 | 0.33 | 383 | 62.8 |
| 14 | 82 | 2.2 | 3.53 | 0.35 | 355 | 74.1 |
| 15 | 78 | 4.3 | 3.20 | 0.58 | 170 | 85.9 |
| 16 | 82 | 4.3 | 3.08 | 0.26 | 153 | 86.1 |
| 17 | 79 | 4.2 | 3.29 | 0.30 | 128 | 81.4 |
| 20 | 75 | 4.4 | 3.31 | 0.40 | 295 | 67.3 |
| 23 | 76 | 4.4 | 3.36 | 0.54 | 348 | 66.7 |

These data indicate the consistently high caustic efficiency obtained using the sandwich type barrier of this invention. These efficiencies are about 10 to 15% higher than those obtained under similar conditions using a single membrane barrier at relatively low caustic concentrations (about 150 gpl) and about 20 to about 30% higher at higher caustic concentrations (about 300 gpl and higher).

EXAMPLE 2

In this Example, aqueous sodium chloride was electrolyzed in a conventional two compartment cell equipped with a bipolar electrode having a steel cathode face and a ruthenium oxide coated titanium clad steel mesh anode face. Three such two compartment cells were enclosed in a single housing. The electrodes of the first two cells ("A" and "B") were separated by a barrier composed of a single 7 mil thick permselective membrane of a hydrolyzed copolymer of tetrafluoroethylene and sulfonated perfluorovinylether of equivalent weight of about 1100. The third cell contained a barrier composed of two layers of the same copolymer membrane. The electrodes were of 60 sq. in. effective area and a current of 60 amperes was expressed across the electrodes.

At the start of the run, aqueous caustic soda containing 50 gpl NaCH was circulated through the cathode compartments and acidified aqueous sodium chloride containing about 250 gpl NaCl and acidified to a pH of about 3.5. The cell was operated at about 65° for 4.5 hours, collecting the caustic liquor produced.

After this period of continuous operation in cell A, the cell voltage was 3.08 volts, the catholyte liquor contained 333 gpl NaOH, which results in a caustic efficiency of 49.1%.

In cell B, the cell voltage was 3.25 volts, the catholyte liquor contained 381 gpl NaOH and thus its caustic efficiency was 59.5%.

In cell C, the cell voltage was 3.65 volts, the catholyte liquor contained 392 gpl NaOH, and its caustic efficiency was 72.2%.

These data indicate the improved caustic efficiency obtained when using a sandwich type barrier of this invention in a bipolar electrode type cell.

It is to be understood that the foregoing specification and examples describe the invention by reference to certain embodiments thereof. Many variations in the details given above will be apparent to those skilled in the art and such variations which do not depart from the scope or spirit of the invention are intended to be covered herein.

What is claimed is:

1. An electrolysis cell comprising a housing, an anode, a cathode, and a permselective barrier substantially impervious to liquids and gases separating said anode and said cathode, said barrier consisting essentially of at least two layers of a hydrolyzed copolymer of tetrafluoroethylene and a sulfonated perfluorovinyl ether of the formula $$FSO_2CF_2CF_2OCF(CF_3)CF_2OCF=CF_2$$

said copolymer having an equivalent weight of from about 900 to 1600.

2. A cell as described in claim 1 wherein said copolymer has an equivalent weight of from about 1100 to 1400.

3. A cell as described in claim 1 wherein said barrier consists of two layers of said hydrolyzed copolymer.

4. A cell as described in claim 3 wherein each layer of said barrier is of a thickness within the range of from about 5 to about 15 mils.

5. A cell as described in claim 1 wherein said barrier consists essentially of a sandwich of at least two layers of said copolymer separated by a porous membrane.

6. A cell as described in claim 5 wherein said porous membrane is composed of asbestos sheet.

7. A cell as described in claim 6 wherein the sandwich barrier consists of two layers of said copolymer separated by a porous membrane of asbestos sheet.

8. A cell as described in claim 1 wherein said anode is a metallic anode.

9. A cell as described in claim 8 wherein said metallic anode consists essentially of a valve metal, the surface of which is coated with a coating comprising a noble metal or oxide thereof.

10. A cell as described in claim 9 wherein said valve metal is titanium.

11. A cell as described in claim 10 wherein the titanium metal is coated with a coating comprising a mixture of ruthenium oxide and titanium oxide.

12. A cell as described in claim 11 wherein said metal anode is formed of a titanium substrate on an aluminum core, said substrate being coated with a coating comprising a mixture oxide and titanium oxide.

13. An electrolysis cell comprising an anode compartment, a cathode compartment, at least one bipolar electrode and a permselective barrier substantially impervious to liquids and gases separating the anode compartment from the cathode compartment of said cell, said barrier consisting essentially of at least two layers of a hydrolyzed co-polymer of tetrafluoroethylene and a sulfonated perfluorovinyl ether of the formula $$FSO_2CF_2CF_2OCF(CF_3)CF_2OCF=CF_2$$

said co-polymer having an equivalent weight of from about 900 to about 1600.

14. A cell as described in claim 13 wherein the cathode side of said bipolar electrode is formed of steel and the anode side of said bipolar electrode is formed of a valve metal having a coating thereon comprising a noble metal or noble metal oxide.

15. A cell as described in claim 14 wherein said valve metal is titanium having a coating thereon comprising ruthenium oxide.

* * * * *